(12) United States Patent
Caggiano

(10) Patent No.: US 7,732,948 B2
(45) Date of Patent: Jun. 8, 2010

(54) PORTABLE ENERGY DEVICE

(75) Inventor: Robert J. Caggiano, Wolcott, CT (US)

(73) Assignee: General Electric Company, Schenectady, NY (US)

( * ) Notice: Subject to any disclaimer, the term of this patent is extended or adjusted under 35 U.S.C. 154(b) by 792 days.

(21) Appl. No.: 11/550,599

(22) Filed: Oct. 18, 2006

(65) Prior Publication Data

US 2008/0096404 A1     Apr. 24, 2008

(51) Int. Cl.
    *H02J 11/00*     (2006.01)
(52) U.S. Cl. ...................................... 307/150
(58) Field of Classification Search ............. 307/150, 307/9.1, 10.1, 11
See application file for complete search history.

(56) References Cited

U.S. PATENT DOCUMENTS

| | | | | |
|---|---|---|---|---|
| 4,593,786 A | * | 6/1986 | Tate | 180/291 |
| 5,559,420 A | * | 9/1996 | Kohchi | 180/68.5 |
| 6,380,637 B1 | * | 4/2002 | Hsu et al. | 290/1 R |
| 6,528,899 B1 | * | 3/2003 | Saito et al. | 307/10.1 |
| 6,894,439 B2 | * | 5/2005 | Stewart et al. | 315/241 P |
| 7,462,951 B1 | * | 12/2008 | Baarman | 307/9.1 |

* cited by examiner

*Primary Examiner*—Albert W Paladini
(74) *Attorney, Agent, or Firm*—Cantor Colburn LLP

(57) ABSTRACT

A portable energy device having a housing and an energy storage device is disclosed. The housing includes electrical input terminals and electrical output terminals, the input terminals being configured to receive electrical power from a vehicle having an electrical chassis operating at DC voltage, the output terminals being configured to provide electrical power to an electrical distribution system connected to a utility power grid operating at AC voltage. The energy storage device is in electrical communication with the input and output terminals, and is configured to store electrical power received from the vehicle via the input terminals and to provide the stored electrical power to the electrical distribution system via the output terminals. The housing is so dimensioned as to be insertable through a space defined by a trunk opening of the vehicle with the trunk open, or so dimensioned as to be insertable between a doorframe of the vehicle and a seat of the vehicle.

16 Claims, 2 Drawing Sheets

PORTABLE ENERGY DEVICE

BACKGROUND OF THE INVENTION

The present disclosure relates generally to portable energy devices, and particularly to a portable energy device for use between a vehicle and a residence.

Existing supplemental energy sources include such devices as solar panels, wind turbines, auxiliary generators, fuel cells, and batteries, which may or may not be directly connectable to the electrical distribution system of a residence via an inverter and controller. Existing power generating devices include among other things automobile generators/alternators. Existing power storage devices include, for example, batteries, capacitor banks, and ultra-capacitors. Existing supplemental energy sources, however, may not fully exploit the benefits of the aforementioned power generation and storage devices.

Accordingly, there remains a need in the art for a supplemental portable energy device that provides advantages over existing art.

BRIEF DESCRIPTION OF THE INVENTION

An embodiment of the invention includes a portable energy device having a housing and an energy storage device. The housing includes electrical input terminals and electrical output terminals, the input terminals being configured to receive electrical power from a vehicle having an electrical chassis operating at DC voltage, the output terminals being configured to provide electrical power to an electrical distribution system connected to a utility power grid operating at AC voltage. The energy storage device is in electrical communication with the input and output terminals, and is configured to store electrical power received from the vehicle via the input terminals and to provide the stored electrical power to the electrical distribution system via the output terminals. The housing is so dimensioned as to be insertable through a space defined by a trunk opening of the vehicle with the trunk open, or so dimensioned as to be insertable between a doorframe of the vehicle and a seat of the vehicle.

Another embodiment of the invention includes a portable energy device having means for receiving electrical input and for providing electrical output, and means for energy storage. The input means having means for receiving electrical power from a vehicle having an electrical chassis operating at DC voltage. The output means having means for providing electrical power to an electrical distribution system connected to a utility power grid operating at AC voltage. The means for energy storage is in electrical communication with the input means and the output means, and includes means for storing electrical power received from the vehicle via the input means and to provide the stored electrical power to the electrical distribution system via the output means. The portable energy device is so dimensioned as to be insertable through a space defined by a trunk opening of the vehicle with the trunk open, or is so dimensioned as to be insertable between a doorframe of the vehicle and a seat of the vehicle.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention, as shown and described by the various figures and accompanying text, provides a portable energy device for storing electrical energy from a vehicle in use via the vehicles alternator/generator, and for transferring the stored energy to an electrical distribution system of a residence connected to an electrical utility grid. While embodiments described herein depict a house as an exemplary residence, it will be appreciated that the disclosed invention is also applicable to other types of residences, such as condominiums, cabins, apartments, trailer homes, and motor homes, for example. It will also be appreciated that the scope of the invention is not limited to residences, and also extends to other structures, such as office buildings, and auxiliary buildings (sheds, pool houses, and barns, for example). Furthermore, it will be appreciated that the scope of the invention also encompasses applications where AC power may be used directly from the PED 100, such as in a tent or in a remote cabin not having utility power available, for example.

Figure 1:
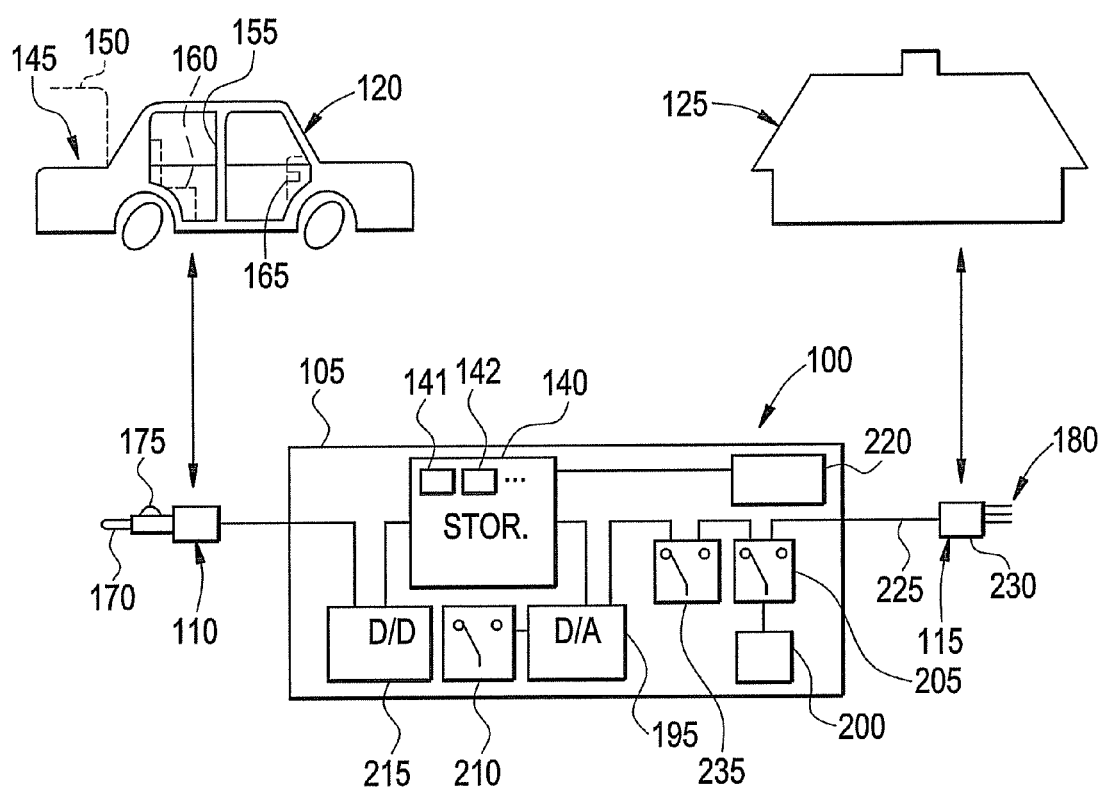
FIG. 1 depicts in block diagram form an exemplary portable energy device in accordance with an embodiment of the invention.

Referring now to FIG. 1, an exemplary embodiment of a portable energy device (PED) 100 is depicted. PED 100 includes a housing 105 having electrical input terminals 110 and electrical output terminals 115, the input terminals 110 configured to receive electrical power from a vehicle 120 having an electrical chassis operating at DC voltage, the output terminals 115 configured to provide electrical power to a house 125 having an electrical distribution system 130 connected to a utility power grid 135 (best seen by referring to FIG. 2) operating at AC voltage, such as 120 VAC, 120/240 VAC, or any other voltage of a utility power grid located anywhere in the world. Within housing 105 is an energy storage device 140, such as a battery, a capacitor bank, an ultra-capacitor, any other energy storage device suitable for the purposes disclosed herein, or a combination thereof, in electrical communication with the input and output terminals 110 and 115. The energy storage device 140 is configured to store electrical power received from the vehicle 120 via the input terminals 110 and to provide the stored electrical power to the electrical distribution system 130 via the output terminals 115. In an embodiment, energy storage device 140 is composed of energy storage modules, referred to generally in FIG. 1 by reference numerals 141 and 142, but not limited to only two modules, that are configured to be interchangeable within the same PED 100, thereby enabling a second set of modules to replace a first set of modules in response to the first set being charged and the second set being receptive of a charge.

In an embodiment, the housing 105 is so dimensioned as to be insertable through a space defined by a trunk opening 145 of the vehicle 120 with the trunk lid 150 open, either fully or substantially fully. As used herein, the term trunk is intended to also encompass a fifth door (rear entry access door/cover) of a sport utility vehicle. In the same or another embodiment, the housing 105 is so dimensioned as to be insertable between a doorframe 155 of the vehicle 120 and a seat 160 of the vehicle 120. While an embodiment of the invention depicts a back door and a back seat of the vehicle with reference to the insertability of the PED 100 into the vehicle, it will be appreciated that this is for illustration purposes only, and that the scope of the invention extends to any seat and any door providing access to that seat (front or back door, side-entry, or rear-entry, for example).

In an embodiment, the input terminals 110 include a connector having contact points 170, 175 that are configured to connect with a cigarette lighter 165 of the vehicle 120. However, the same or another embodiment may have another type of connector that is configured to plug into an auxiliary outlet of the vehicle, such as may be located in the trunk of the vehicle 120 for example. With different configurations of input terminals 110, a user will be able to plug into a 12 VDC supply of a fossil fuel powered vehicle, or into a 400 VDC supply of an electric powered vehicle.

Figure 2:
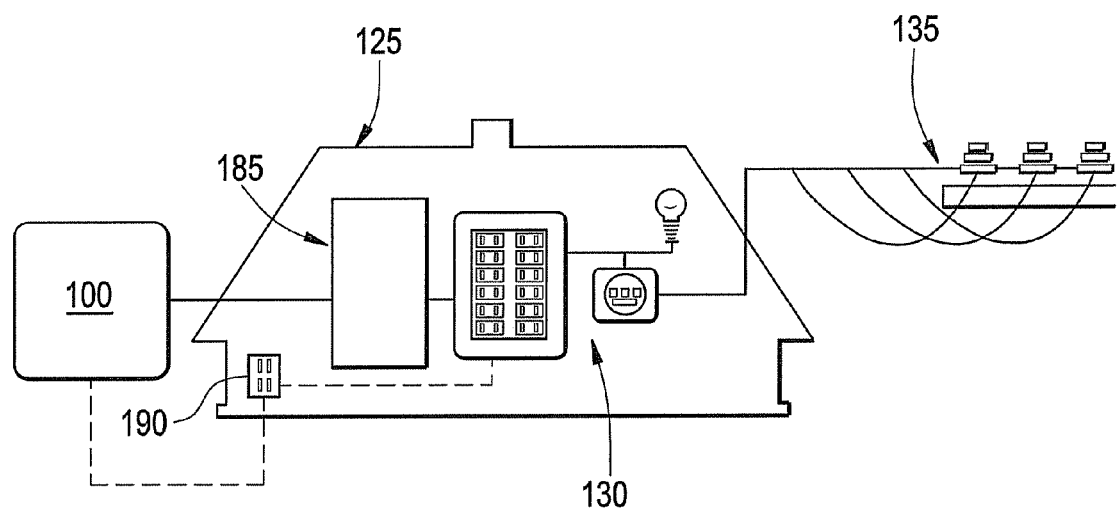
FIG. 2 depicts an exemplary application arrangement for the portable energy device of FIG. 1 in accordance with an embodiment of the invention.

Referring now to FIG. 2, in an embodiment, the output terminals 115 include a connector having prongs 180 configured to connect to an AC inverter 185 electrically connected to the electrical distribution system 135. However, the same or another embodiment may have another type of connector with prongs 180 configured to connect to a duplex outlet plug 190 electrically connected to the electrical distribution system 135. An embodiment employing prongs 180 configured to connect to a duplex outlet plug 190 is referred to in the art as being configured for back-feeding the electrical distribution system 130.

In a back-feed configuration, PED 100 is equipped with a digital-to-analog (D/A) inverter 195 (depicted in FIG. 1) configured and disposed to transform the stored electrical power from DC to AC in response to a demand for delivery of the electrical power from the storage device 140 to the output terminals 115, thereby providing proper voltage matching with the electrical distribution system 135, and enabling the PED 100 to be plugged into any duplex outlet of the house. In an embodiment, PED 100 includes a switch 235 configured and disposed in power communication with the output terminals 115 such that power from the energy storage device 140 is provided to the output terminals only in response to a demand for power from the electrical distribution system. Switch 235 may be automatically operated in response to a demand for power, or may be manually operated by a user thereby enabling disconnection of energy storage device 140 from the electrical distribution system 130 even when output terminals 115 are connected thereto. Also in the back-feed configuration, PED 100 may be equipped with a sensor 200 configured and disposed to sense the presence of available power from the utility grid, and an auto-shutoff disconnect switch 205 configured and disposed to disconnect the energy storage device 140 from the electrical distribution system 130 in the event that grid power is down, thereby preventing inadvertent back-feeding of the utility grid that may be under service.

Referring back to FIG. 1, in an embodiment configured to plug into an inverter 185 and a duplex outlet 190, such as via two connectors or an adapter for example, PED 100 is equipped with a switch 210 for activating or deactivating the internal D/A inverter 195 as appropriate. PED 100 may also be equipped with a digital-to-digital (D/D) converter 215 for proper power conditioning of the power received from the vehicle 120 before it is stored in storage device 140.

In an embodiment, a metering system 220 is configured and disposed to indicate, via a display screen for example, energy level of the energy storage device 140, charging status of the energy storage device 140, conversion rate of the stored energy to the power delivered to the output terminals 115, or a combination of the foregoing values capable of being metered.

In an embodiment, an electrical power cord 225 is electrically connected between the housing 105 and the connector 230 of output terminals 115, and is so dimensioned as to allow connection of the connector 230 to either the AC inverter 185 or the duplex outlet 190 without removal of the PED 100 from the vehicle 120.

While certain combinations of components within PED 100, such as D/A 195, sensor 200, switch 205, switch 210, D/D 215 and metering system 220, have been described herein, it will be appreciated that these certain combinations are for illustration purposes only and that any combination of any of the foregoing components, with appropriate connections and interdependent components being present, may be employed in accordance with an embodiment of the invention. Any and all such combinations are contemplated herein and are considered within the scope of the invention disclosed.

While embodiments disclosed herein depict an automobile for vehicle 120, it will be appreciated that the scope of the invention is not so limited, and that the scope of the invention also encompasses other vehicles equipped with a DC voltage energy source, such as vans, trucks, sport utility vehicles, motor homes, construction vehicles, vehicles of the armed forces, boats, submarines, and airplanes, for example, or any land, water or air vehicle suitable for the purposes disclosed herein.

As disclosed, some embodiments of the invention may include some of the following advantages: a standard connector at the input terminals for adaptability to any motor vehicle; an extended electrical cord connected to the output terminals to allow the PED to remain in the vehicle while utilizing the energy stored therein; a modular energy storage arrangement for ease of use in charging additional sets of batteries when a first set is fully charged; control switches for energy usage so energy fed into a home is demand based; and, utilization of existing technology that may already be present in a home having auxiliary power from solar panels or wind turbines, for example.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:
1. A portable energy device, comprising:
a housing having electrical input terminals and electrical output terminals, the input terminals configured to receive electrical power from a vehicle having an electrical chassis operating at DC voltage, the output terminals configured to provide electrical power to an electri- cal distribution system connected to a utility power grid operating at AC voltage; and an energy storage device in electrical communication with the input and output terminals, the energy storage device configured to store electrical power received from the vehicle via the input terminals and to provide the stored electrical power to the electrical distribution system via the output terminals;

wherein the housing is so dimensioned as to be insertable through a space defined by a trunk opening of the vehicle with the trunk open, or so dimensioned as to be insertable between a doorframe of the vehicle and a seat of the vehicle.

2. The device of claim 1, wherein:
the input terminals comprise a connector configured to connect with a cigarette lighter of the vehicle.

3. The device of claim 1, wherein:
the output terminals comprise a connector configured to connect to an AC inverter electrically connected to the electrical distribution system.

4. The device of claim 1, further comprising:
an inverter configured and disposed to transform the stored electrical power from DC to AC in response to a demand for delivery of the electrical power from the storage device to the output terminals.

5. The device of claim 4, wherein:
the output terminals comprise a connector configured to connect to a duplex outlet plug electrically connected to the electrical distribution system.

6. The device of claim 5, wherein:
the energy storage device comprises a battery, a capacitor bank, an ultra-capacitor, or a combination of the foregoing storage devices.

7. The device of claim 1, further comprising:
a metering system configured to indicate energy level of the energy storage device, charging status of the energy storage device, conversion rate of the stored energy to the power delivered to the output terminals, or a combination of the foregoing values capable of being metered.

8. The device of claim 3, further comprising:
an electrical power cord electrically connected between the housing and the connector, the cord being so dimensioned as to allow connection of the connector to the AC inverter without removal of the device from the vehicle.

9. The device of claim 5, further comprising:
an electrical power cord electrically connected between the housing and the connector, the cord being so dimensioned as to allow connection of the connector to the duplex outlet without removal of the device from the vehicle.

10. The device of claim 1, wherein:
the energy storage device comprises energy storage modules configured to be interchangeable within the same device, thereby enabling a second set of modules to replace a first set of modules in response to the first set being charged and the second set being receptive of a charge.

11. The device of claim 1, further comprising:
a switch configured and disposed in power communication with the output terminals such that power from the energy storage device is provided to the output terminals only in response to a demand for power from the electrical distribution system.

12. The device of claim 1, wherein the DC voltage of the electrical chassis has a voltage of 12 VDC.

13. The device of claim 1, wherein the DC voltage of the electrical chassis has a voltage of 400 VDC.

14. The device of claim 1, wherein the AC voltage of the electrical distribution system connected to a utility power grid has a voltage of 120 VAC.

15. The device of claim 1, further comprising:
an auto-shutoff switch configured and disposed to disconnect the energy storage device from the electrical distribution system in response to an absence of AC voltage being sensed from the utility power grid.

16. A portable energy device, comprising:
means for receiving electrical input and for providing electrical output, the input means comprising means for receiving electrical power from a vehicle having an electrical chassis operating at DC voltage, the output means comprising means for providing electrical power to an electrical distribution system connected to a utility power grid operating at AC voltage; and means for energy storage in electrical communication with the input means and the output means, the means for energy storage comprising means for storing electrical power received from the vehicle via the input means and to provide the stored electrical power to the electrical distribution system via the output means;

wherein the portable energy device is so dimensioned as to be insertable through a space defined by a trunk opening of the vehicle with the trunk open, or is so dimensioned as to be insertable between a doorframe of the vehicle and a seat of the vehicle.

* * * * *